United States Patent [19]
Swanson

[11] 3,871,180
[45] Mar. 18, 1975

[54] WATER DESALINIZATION SYSTEM
[75] Inventor: Joe B. Swanson, Inglewood, Calif.
[73] Assignee: The Raymond Lee Organization, Inc., New York, N.Y. ; a part interest
[22] Filed: Nov. 29, 1973
[21] Appl. No.: 419,958

[52] U.S. Cl............ 60/648, 203/10, 203/49, 203/90, 203/100, 203/DIG. 20
[51] Int. Cl............ F01k 3/08, F01k 15/00
[58] Field of Search.. 203/49, 90, 10, 100, DIG. 20; 202/234; 60/648

[56] References Cited
UNITED STATES PATENTS

| | | | |
|---|---|---|---|
| 3,147,598 | 9/1964 | Wilson | 60/108 R X |
| 3,163,587 | 12/1964 | Champe | 203/10 X |
| 3,278,396 | 10/1966 | Parson | 202/234 X |
| 3,487,423 | 12/1969 | White | 60/108 R |
| 3,522,151 | 7/1970 | Dismore | 203/90 X |
| 3,557,863 | 1/1971 | Becker | 203/49 X |
| 3,732,692 | 5/1973 | Norell | 60/108 X |

Primary Examiner—Martin P. Schwadron
Assistant Examiner—Allen M. Ostrager
Attorney, Agent, or Firm—Daniel Jay Tick

[57] ABSTRACT

A water desalinization system comprises an atomizer for atomizing salt water. An evaporator evaporates the atomized salt water to provide steam with a residue of solid salts. An accumulator accumulates the steam. A steam turbine is driven by the steam. An electrical generator is coupled to and driven by the steam turbine for producing electric power. A condenser converts the steam to pure water after it drives the turbine.

2 Claims, 3 Drawing Figures

WATER DESALINIZATION SYSTEM

DESCRIPTION OF THE INVENTION

The present invention relates to a water desalinization system.

Objects of the invention are to provide a water desalinization system which is easily installed and which functions with efficiency, effectiveness and reliability to provide pure water from salt water and, at the same time, produces electric power.

In order that the invention may be readily carried into effect, it will now be described with reference to the accompanying drawing, wherein.

In the FIGS., the same components are identified by the same reference numerals.

Figure 1:
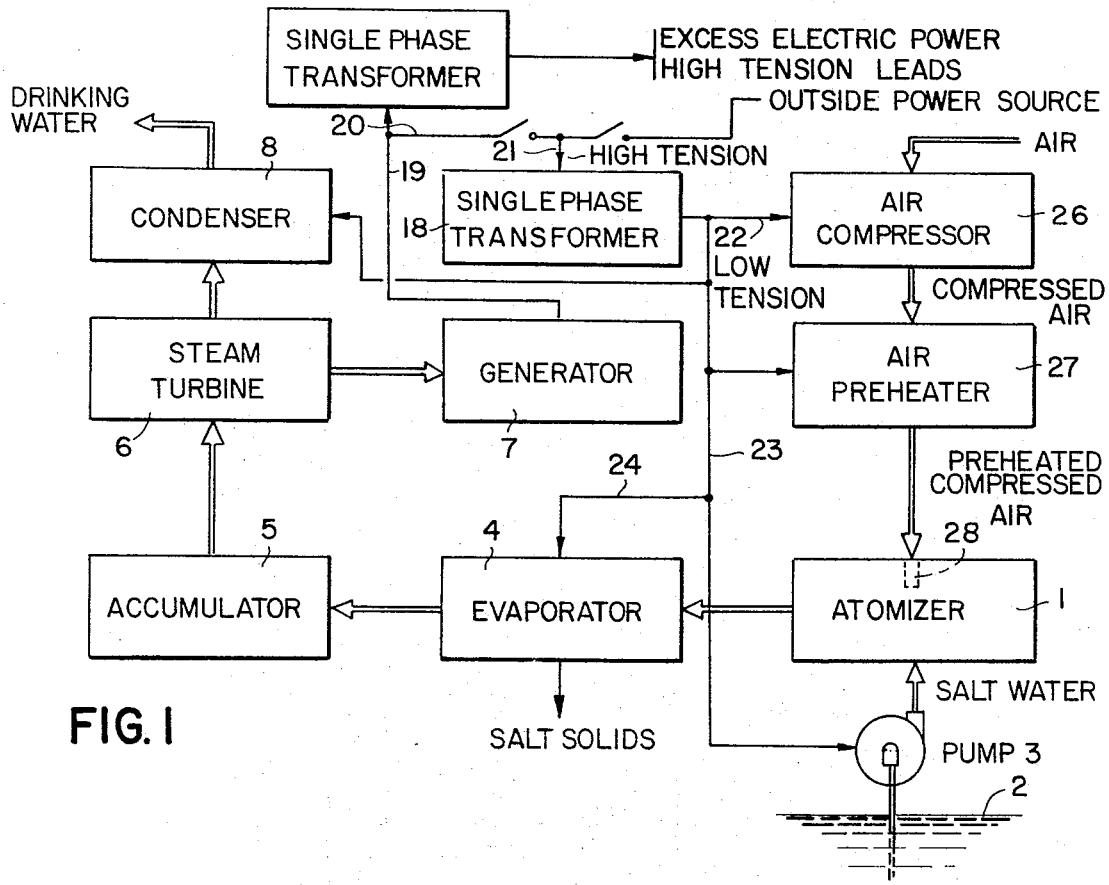
FIG. 1 is a block diagram of an embodiment of the water desalinization system of the invention.

The water desalinization system of the invention comprises an atomizer 1 for atomizing salt water supplied from any source, such as, for example, an ocean 2, via a pump 3.

An evaporator 4, which may comprise, for example, a combustion chamber, evaporates the atomized salt water to provide steam with a residue of solid salts.

An accumulator 5 accumulates the steam. The steam drives a steam turbine 6.

An electrical generator 7 is coupled to and driven by the steam turbine 6 and produces electrical power.

A condenser 8 converts the steam to pure water after the steam drives the turbine.

Figure 2:
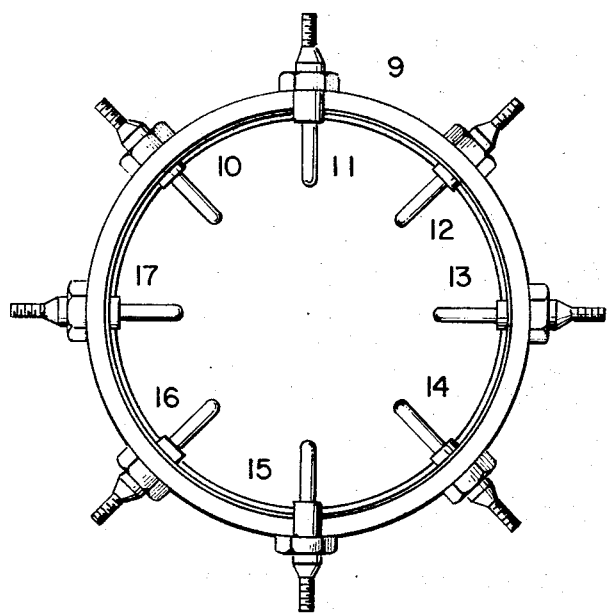
FIG. 2 is a sectional view of an embodiment of an evaporator utilized in the system of FIG. 1.
Figure 3:
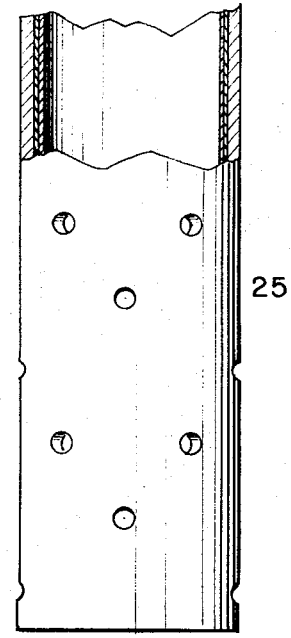
FIG. 3 is a partly cutaway view of part of the evaporator of FIG. 2.

The evaporator comprises, as shown in FIG. 2, a vessel 9 of substantially circular cross-section having a plurality of equiangularly spaced electrodes 10, 11, 12, 13, 14, 15, 16 and 17 therein positioned substantially radially (FIG. 2). A high voltage transformer 18 is electrically connected between the generator 7 and the electrodes 10 to 17 of the evaporator via electrical conductors 19, 20, 21, 22, 23 and 24 and functions as a spark producer to produce high intensity, high heat, sparking between the electrodes. The evaporator includes a perforated tube 25 (FIG. 3) for directing the atomized water from the atomizer 1 as fine streams into the sparking fields in the vessel 9.

The atomizer 1 comprises an air compressor 26 which is electrically connected to the electrical generator 7 via the electrical conducting leads 19, 20 and 22 and functions to compress air. The compressed air is heated in an air preheater 27. The preheated compressed air is directed via a directing device 28 at right angles to the flow of salt water in the atomizer 1.

While the invention has been described by means of a specific example and in a specific embodiment, I do not wish to be limited thereto, for obvious modifications will occur to those skilled in the art without departing from the spirit and scope of the invention.

I claim:

1. A water desalinization system, comprising
    atomizer means for atomizing salt water;
    evaporator means for evaporating the atomized salt water to provide steam with a residue of solid salts;
    accumulator means for accumulating the steam;
    steam turbine means driven by the steam;
    electrical generator means coupled to and driven by the steam turbine means for producing electric power, the atomizer means comprising air compressor means electrically connected to the electrical generator means for compressing air, preheating means for heating the compressed air and directing means for directing the preheated compressed air at right angles to the flow of salt water, the evaporator means comprising a vessel of substantially circular cross-section having a plurality of equiangularly spaced electrodes therein positioned substantially radially and spark producing means including high voltage transformer means electrically connected between the electrical generator means and the electrodes for producing high heat sparking between the electrodes in the vessel; and
    condenser means for converting the steam to pure water after it drives the turbine means.

2. A water desalinization system as claimed in claim 1, wherein the evaporator means includes perforated tube means for directing the atomized water from the atomizer means as fine streams into the sparking fields in the vessel.

* * * * *